United States Patent
Venugopal et al.

(10) Patent No.: US 11,425,650 B2
(45) Date of Patent: Aug. 23, 2022

(54) SIGNALING FOR MULTI-PANEL UE ACTIVATION

(71) Applicant: QUALCOMM Incorporated, San Diego, CA (US)

(72) Inventors: Kiran Venugopal, Raritan, NJ (US); Jung Ho Ryu, Fort Lee, NJ (US); Tianyang Bai, Bridgewater, NJ (US); Yan Zhou, San Diego, CA (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/848,480

(22) Filed: Apr. 14, 2020

(65) Prior Publication Data
US 2020/0344686 A1      Oct. 29, 2020

Related U.S. Application Data

(60) Provisional application No. 62/839,528, filed on Apr. 26, 2019.

(51) Int. Cl.
*H04W 24/10* (2009.01)
*H04W 52/02* (2009.01)
*H04W 72/14* (2009.01)

(52) U.S. Cl.
CPC ... *H04W 52/0229* (2013.01); *H04W 52/0235* (2013.01); *H04W 72/14* (2013.01)

(58) Field of Classification Search
CPC .............. H04B 7/0602; H04B 7/0691; H04W 52/0229; H04W 52/0235; H04W 72/046; H04W 72/14; Y02D 30/70
See application file for complete search history.

(56) References Cited

U.S. PATENT DOCUMENTS

| | | | |
|---|---|---|---|
| 2019/0349064 A1* | 11/2019 | Huang | ............... H04W 72/0413 |
| 2020/0228267 A1* | 7/2020 | Park | ..................... H04L 5/0094 |

(Continued)

FOREIGN PATENT DOCUMENTS

WO      2018128351 A1      7/2018

OTHER PUBLICATIONS

Huawei, et al., "Panel-Based UL Beam Selection", 3GPP Draft, 3GPP TSG RAN WG1 Meeting #96bis, R1-1903975, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051699388, 6 pages, Retrieved from the Internet: URL: http://www.3gpp.org/ftp/Meetings%5F3GPP%5FSYNC/RAN1/Docs/R1%2D1903975%2Ezip. [retrieved on Apr. 7, 2019] section 4.1 section 4.2 section 1.

(Continued)

*Primary Examiner* — Phuc H Tran
(74) *Attorney, Agent, or Firm* — ArentFox Schiff LLP

(57) ABSTRACT

The present disclosure provides signaling for multi-panel user equipment (MPUE) activation. The MPUE may have at least an active first panel and an inactive second panel. The MPUE may determine to activate the second panel. The MPUE may activate the second panel in response to the determination. The MPUE may transmit, from the active first panel to a base station, a status indicating that the second panel is active. The MPUE may transmit, after an activation time, an uplink transmission from the second panel to the base station.

30 Claims, 10 Drawing Sheets

(56) References Cited

U.S. PATENT DOCUMENTS

| | | | |
|---|---|---|---|
| 2020/0358585 A1* | 11/2020 | Ryu | H04L 5/001 |
| 2020/0359197 A1* | 11/2020 | Venugopal | H04W 8/24 |
| 2021/0045070 A1* | 2/2021 | Yi | H04W 52/365 |
| 2021/0051593 A1* | 2/2021 | Park | H04L 1/0026 |
| 2021/0051710 A1* | 2/2021 | Cirik | H04W 74/0833 |
| 2021/0083748 A1* | 3/2021 | Guan | H04B 7/0628 |
| 2021/0099223 A1* | 4/2021 | Zhang | H04B 7/0828 |
| 2021/0160964 A1* | 5/2021 | Sun | H04B 7/088 |
| 2021/0168714 A1* | 6/2021 | Guan | H04B 7/0691 |
| 2021/0258811 A1* | 8/2021 | Zhang | H04B 7/088 |

OTHER PUBLICATIONS

International Search Report and Written Opinion—PCT/US2020/028317—ISA/EPO—dated Jul. 10, 2020.

ZTE: "Enhancements on Multi-Beam Operation", 3GPP Draft, 3GPP TSG RAN WG1 Meeting #96bis, R1-1904014, Enhancements on Multi-Beam Operation, 3rd Generation Partnership Project (3GPP), Mobile Competence Center, 650, Route Des Lucioles, F-06921 Sophia-Antipolis Cedex, France, vol. RAN WG1, No. Xian, China, Apr. 8, 2019-Apr. 12, 2019, Mar. 30, 2019 (Mar. 30, 2019), XP051691228, 17 pages, Retrieved from the Internet: URL: http://www.3gpp.org/ftp/tsg%5Fran/WG1%5FRL1/TSGR1%5F96b/Docs/R1%2D1904014%2Ezip. retrieved on Mar. 30, 2019.

PCT/CN2018/107940, filed on Sep. 27, 2018, 75 pages.

* cited by examiner

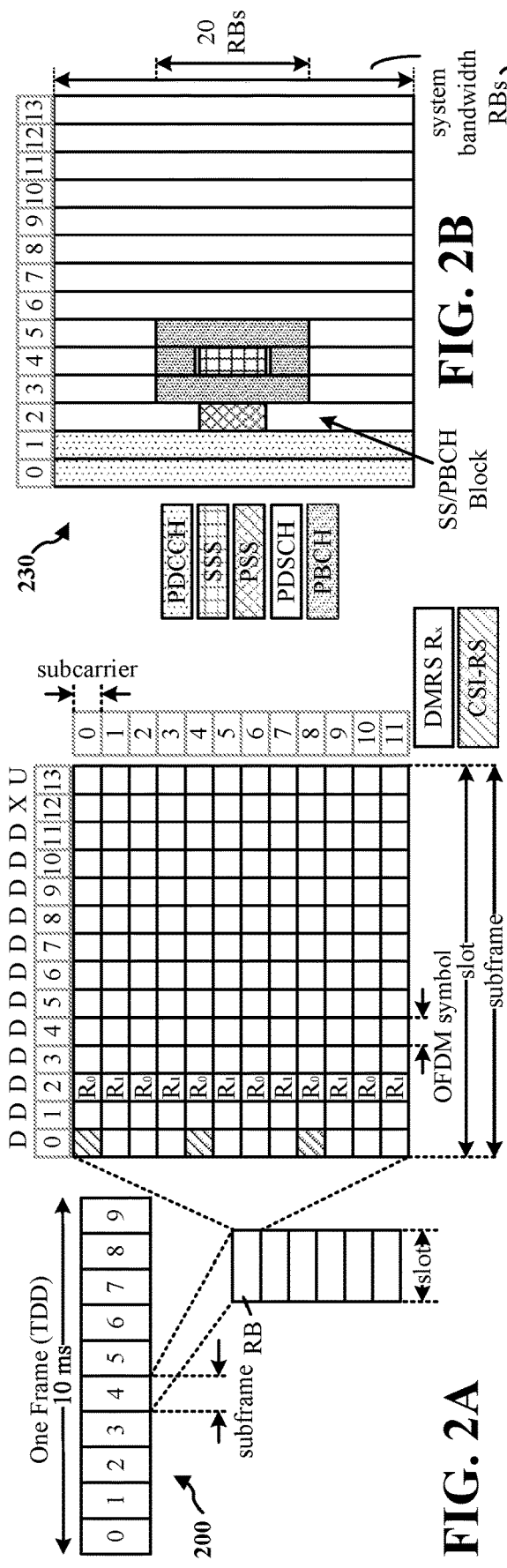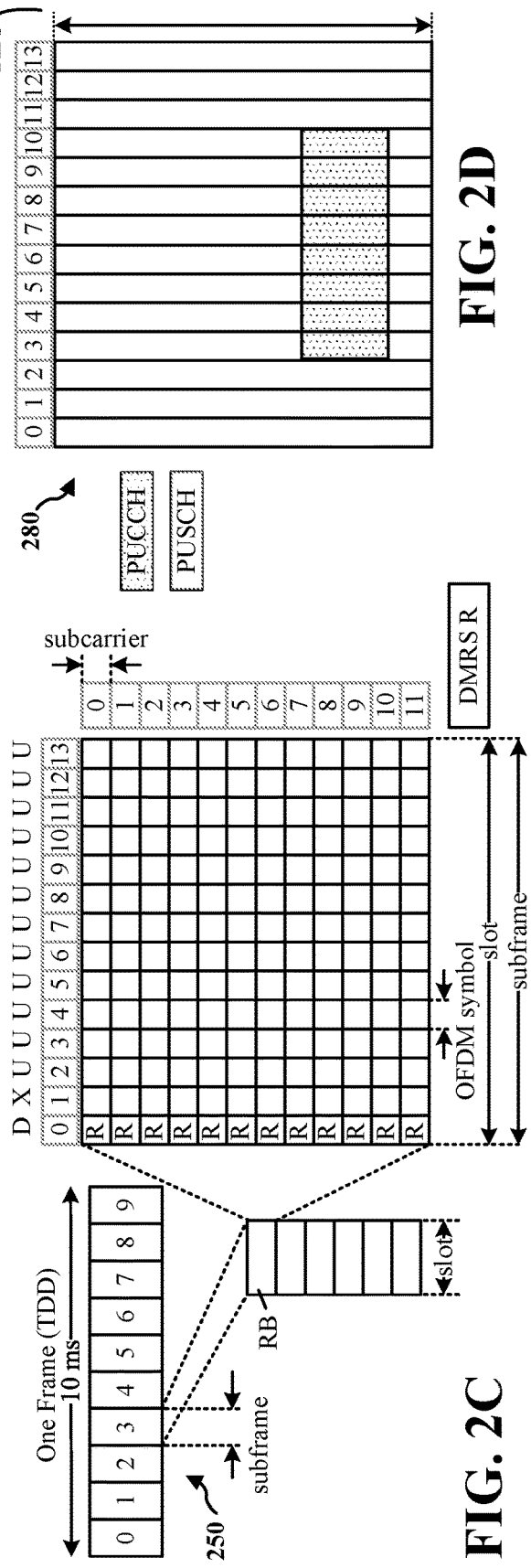
FIG. 2A  FIG. 2B  FIG. 2C  FIG. 2D

SIGNALING FOR MULTI-PANEL UE ACTIVATION

CLAIM OF PRIORITY UNDER 35 U.S.C. § 119

This application claims priority to U.S. Provisional Application No. 62/839,528 titled "SIGNALING FOR MULTI-PANEL UE ACTIVATION," filed Apr. 26, 2019, which is assigned to the assignee hereof, and incorporated herein by reference in its entirety.

BACKGROUND

Technical Field

The present disclosure relates generally to communication systems, and more particularly, to user equipment (UE) having multiple panels.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a non-transitory computer-readable medium, and a user equipment are provided. The method may include determining, at a user equipment (UE) having at least an active first panel and an inactive second panel, to activate the second panel. The method may include activating the second panel in response to the determination. The method may include transmitting, from the active first panel to a base station, a status indicating that the second panel is active. The method may include transmitting, after an activation time, an uplink transmission from the second panel to the base station.

In another aspect, the disclosure provides an apparatus for wireless communication including a memory storing computer-executable instructions; and at least one processor coupled to the memory and configured to execute the computer-executable instructions. The at least one processor may be configured to determine, at a UE having at least an active first panel and an inactive second panel, to activate the second panel. The at least one processor may be configured to activate the second panel in response to the determination. The at least one processor may be configured to transmit, from the active first panel to a base station, a status indicating that the second panel is active. The at least one processor may be configured to transmit, after an activation time, an uplink transmission from the second panel to the base station.

In another aspect, the disclosure provides an apparatus for wireless communication. The apparatus may include means for determining, at a UE having at least an active first panel and an inactive second panel, to activate the second panel. The apparatus may include means for activating the second panel in response to the determination. The apparatus may include means for transmitting, from the active first panel to a base station, a status indicating that the second panel is active. The apparatus may include means for transmitting, after an activation time, an uplink transmission from the second panel to the base station.

In another aspect, the disclosure provides a non-transitory computer-readable medium storing computer executable code, the code when executed by a processor causes the processor to determine, at a UE having at least an active first panel and an inactive second panel, to activate the second panel. The code when executed by a processor causes the processor to activate the second panel in response to the determination. The code when executed by a processor causes the processor to transmit, from the active first panel to a base station, a status indicating that the second panel is active. The code when executed by a processor causes the processor to transmit, after an activation time, an uplink transmission from the second panel to the base station.

In another aspect, a second method, non-transitory computer-readable medium, and base station are provided. The second method may include receiving, from a user equipment (UE) including at least a first panel and a second panel, a status for each panel indicating whether the respective panel is active. The second method may include measuring a signal quality or beam quality associated with the first panel. The second method may include measuring a signal quality or beam quality associated with the second panel. The second method may include determining an activation of the second panel. The second method may include receiving, after an activation time, an uplink transmission from the second panel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame.

FIG. 2B is a diagram illustrating an example of DL channels within a 5G/NR subframe.

FIG. 2C is a diagram illustrating an example of a second 5G/NR frame.

FIG. 2D is a diagram illustrating an example of a 5G/NR subframe.

DETAILED DESCRIPTION

Figure 1:
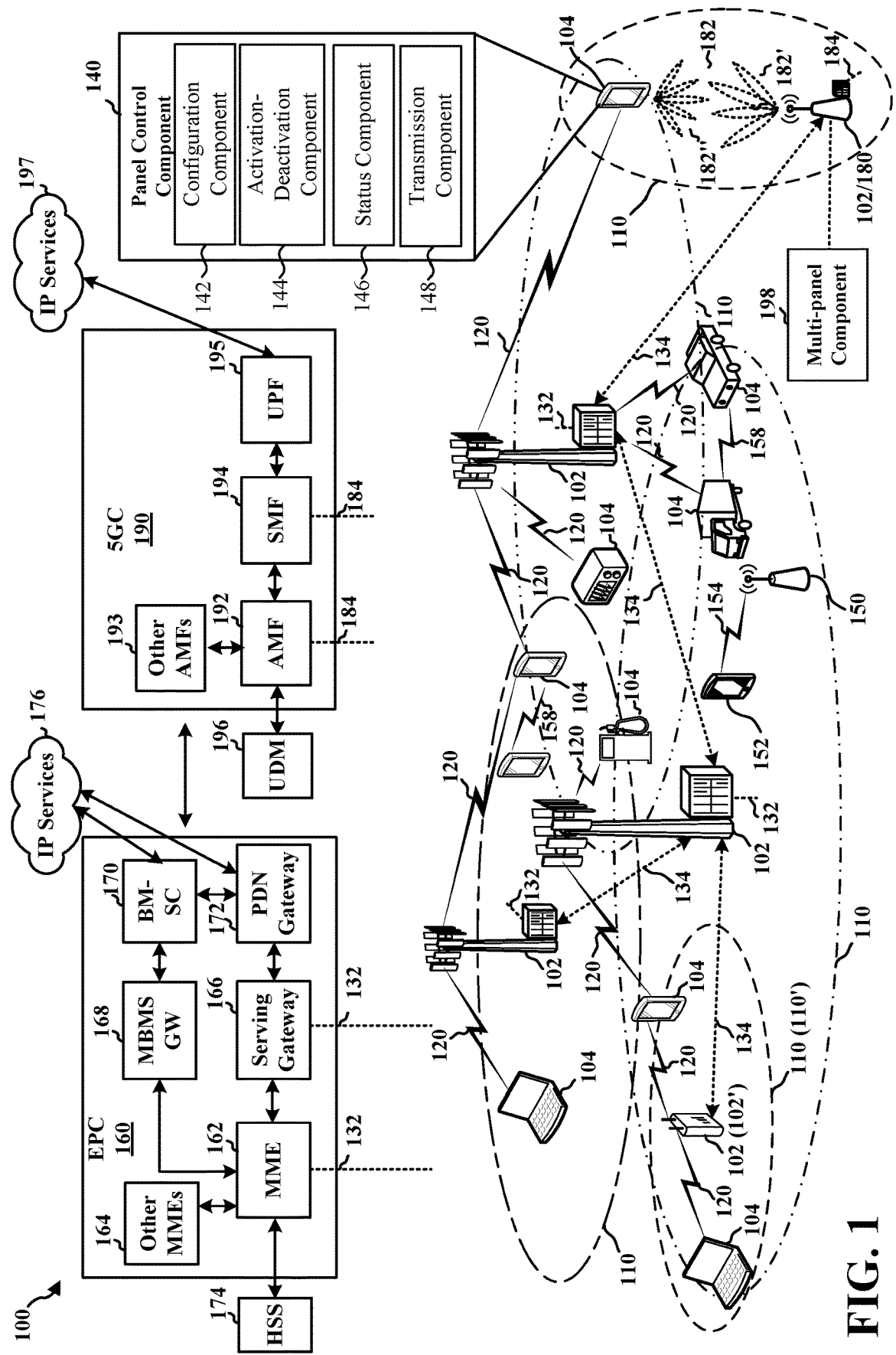
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A multi-panel UE (MPUE) may be a UE that includes multiple panels. The terms MPUE and UE may be used interchangeably. An example of an MPUE may include a folding device that includes physical panels that fold with respect to each other. From a wireless communications perspective, however, the concept of an MPUE may be broader and may include any device with multiple antenna groups configured as panels. That is, an MPUE may not be limited to a particular form factor.

An MPUE may provide flexibility in selection of antennas for wireless communications. In particular, the concept of a panel may be used to activate or deactivate certain antennas in order to improve performance and/or save battery power. Generally, multiple panels may be activated at the same time, but a UE does not need to activate multiple panels. In an aspect, although multiple panels may be active, one panel may be selected for uplink transmission using a single beam.

In other aspects, multiple beams may be transmitted from multiple panels, or multiple beams may be transmitted from one panel.

In an aspect, an MPUE may control activation and/or deactivation of a panel. For example, the UE may activate or deactivate panels based on power consumption and maximum permissible exposure (MPE). Improvements in signaling between an MPUE and a base station may be desired to coordinate activation and deactivation of the panels and to select transmission properties corresponding to the active panels.

In an aspect, the present disclosure provides signaling mechanisms that allow both the base station and the MPUE to determine whether to activate or deactivate a panel while also allowing both the base station and the MPUE to be aware of a current panel status for facilitating communications, particularly uplink transmissions. A panel configuration message may be transmitted by an MPUE to provide a base station with information regarding an activation time of one or more panels with respect to one or more modes of the panel. The mode may indicate whether the panel is active or inactive, for example, in a sleep mode. The base station may use the activation time information for scheduling to determine when a panel is capable of an uplink transmission. A panel status message may be transmitted by an MPUE to provide a base station with a current status or mode of one or more panels whenever a UE activates or deactivates one or more panels. The base station may use the status of a panel to determine transmission and reception capabilities. An activation or deactivation command may be transmitted by the base station to initiate an activation or deactivation process for a panel of the MPUE.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macrocells (high power cellular base station) and/or small cells (low power cellular base station). The macrocells include base stations. The small cells include femtocells, picocells, and microcells.

One or more of the UEs 104 may be an MPUE including at least a first panel and a second panel and a panel control component 140. The panel control component 140 may control activation and deactivation of the panels and perform signaling regarding the configuration and status of the panels. For example, the panel control component 140 may include one or more of a configuration component 142, an activation-deactivation component 144, a status component 146, and a transmission component 148. The configuration component 142 may transmit a panel configuration indicating one or more activation times for the panels. The activation-deactivation component 144 may determine to activate an inactive panel and may perform an activation process for the inactive panel. The activation-deactivation component 144 may determine to deactivate an active panel and may perform a deactivation process for the active panel. The status component 146 may transmit a status indicating that the second panel is active. The transmission component 148 may transmit an uplink transmission from the second panel after an activation time.

Figure 10:
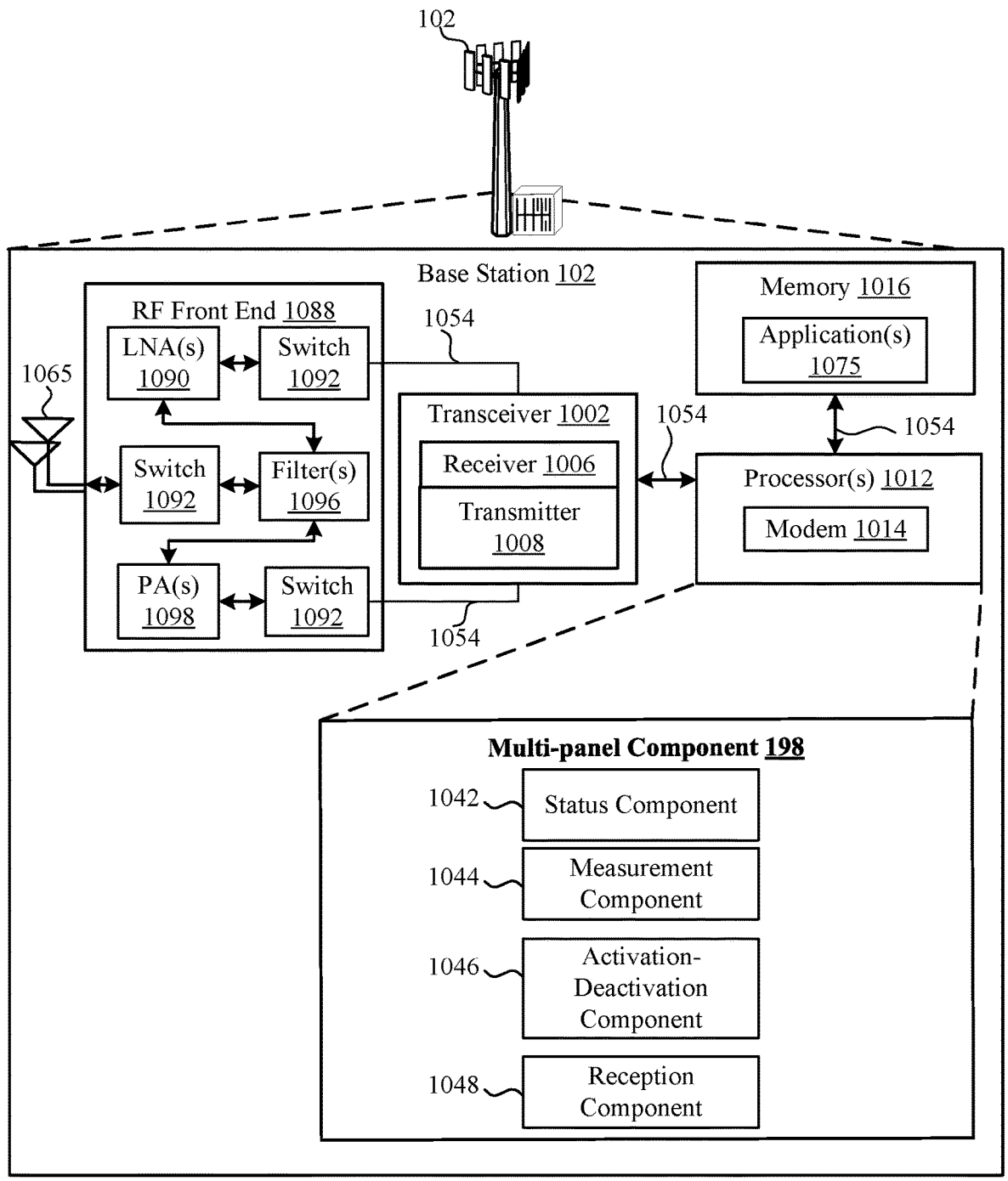
FIG. 10 is a schematic diagram of example components of the base station of FIG. 1.

A base station 102 in communication with the UE 104 may include a multi-panel component 198 that communicates with the panel control component 140 for activating and deactivating panels. For example, as illustrated in FIG. 10, the multi-panel component 198 may include one or more of a status component 1042, a measurement component 1044, an activation-deactivation component 1046, and a reception component 1048. The status component 1042 may receive a status for each panel of the UE 104. The measurement component 1044 may measure a signal quality or beam quality for each panel. The activation-deactivation component 1046 may determine an activation or deactivation of an inactive panel. The reception component 1048 may receive, after an activation time, an uplink transmission from the previously inactive panel. Further details of the multi-panel component 198 are described below.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu *15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
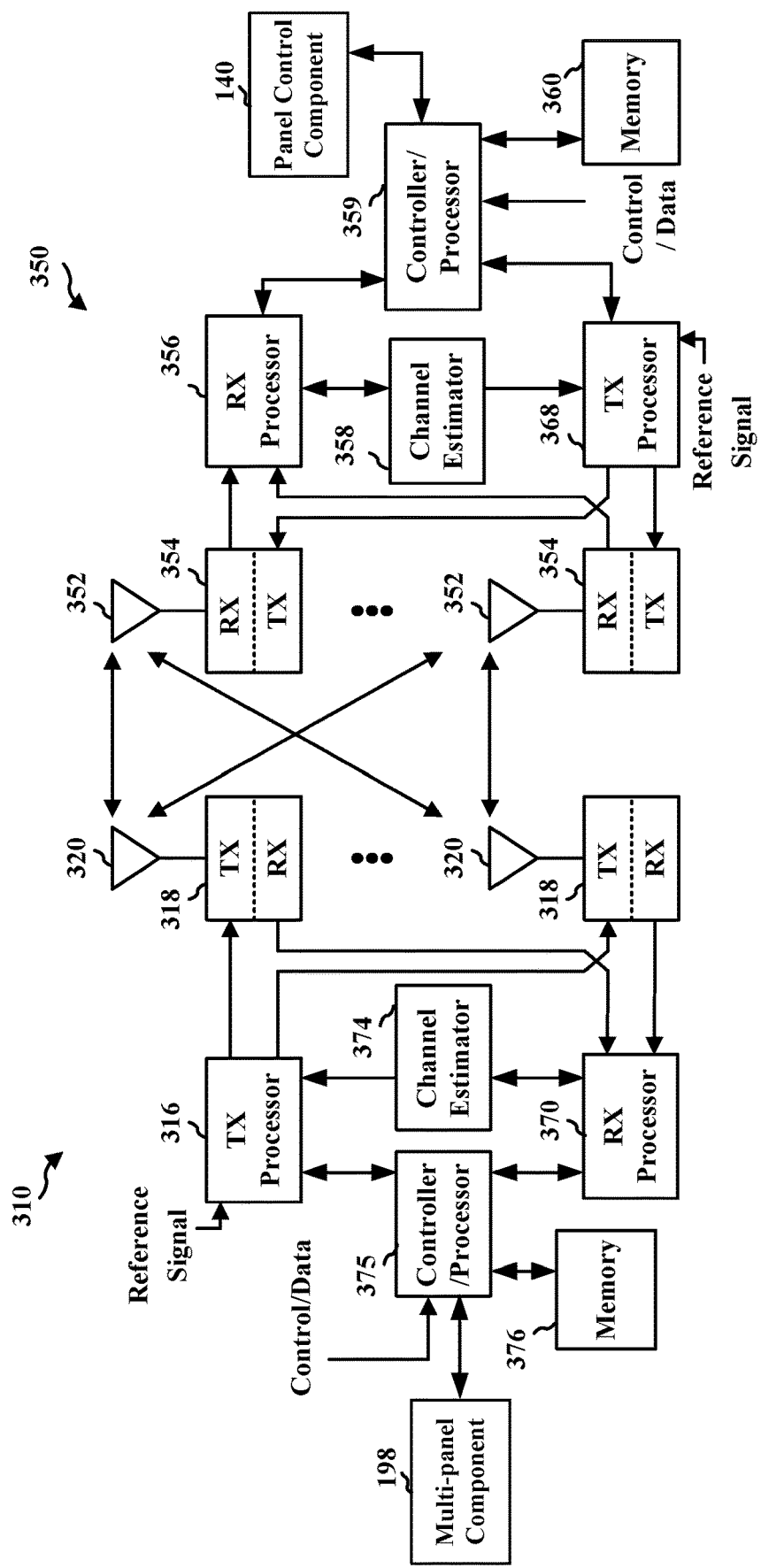
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the panel control component 140 of FIG. 1.

At least one of the TX processor 316, the RX processor 370, and the controller/processor 375 may be configured to perform aspects in connection with the multi-panel component 198 of FIG. 1.

Figure 4:
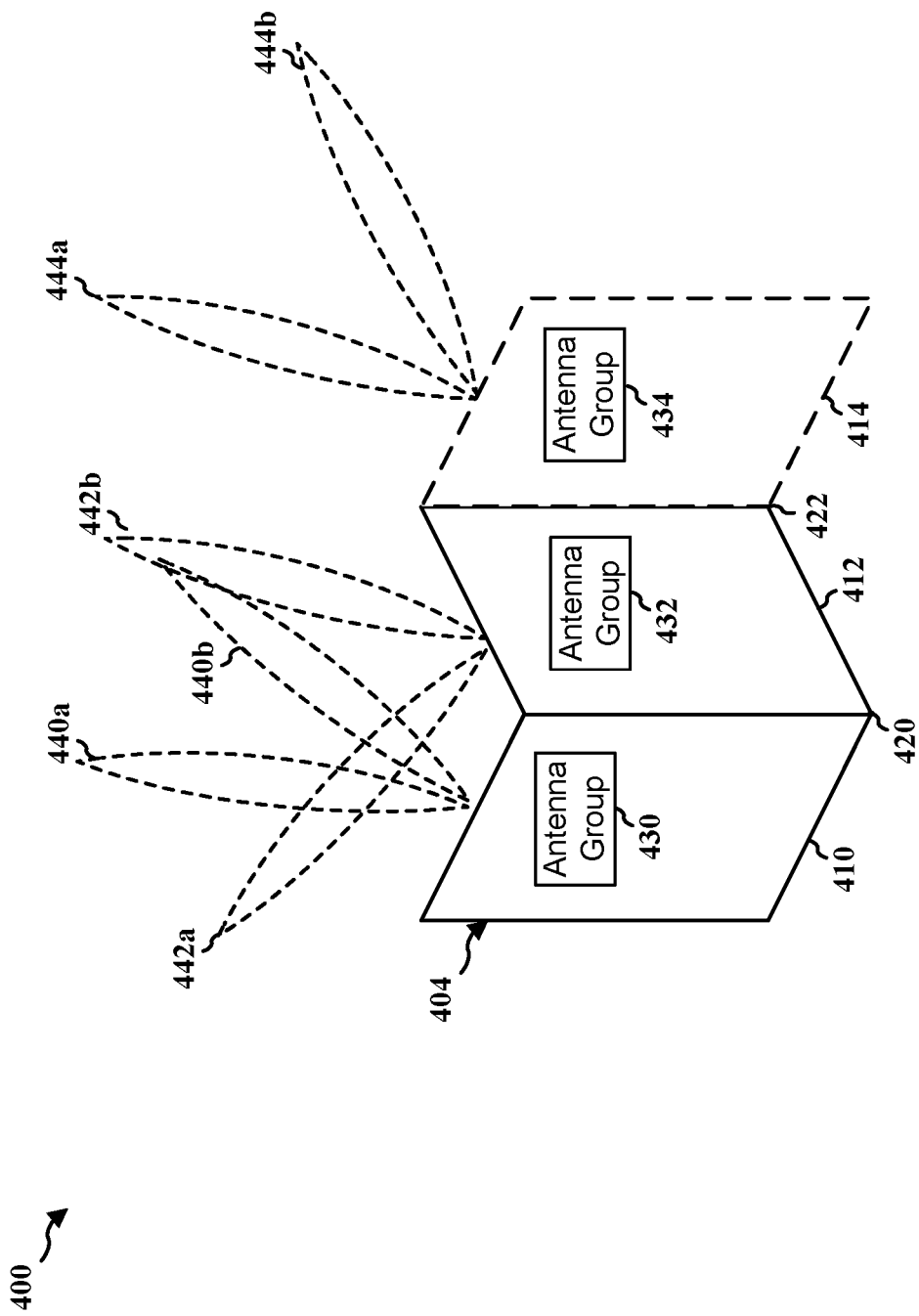
FIG. 4 is a conceptual diagram of a first example multi-panel UE.

Turning to FIG. 4 a conceptual diagram 400 includes an example multi-panel UE (MPUE) 404. The MPUE 404 may include multiple panels such as a first panel 410, a second panel 412, an optional third panel 414. The MPUE 404 may include additional optional panels (not shown). Generally, a panel may be a component of a UE including an antenna group including one or more antennas and associated with a panel ID. An antenna may include one or more antennas, antenna elements, and/or antenna arrays. Each panel may operate with a degree of independence. For example, each panel may be individually activated or deactivated. An activated panel may be used for transmission and/or reception. A deactivated panel may not be used for transmission and/or reception. For example, a deactivated panel may be in a sleep mode that saves power. In an aspect, a deactivated panel may be in a light sleep mode or a deep sleep mode. Each panel may be configured with a different panel identifier (panel ID). In an aspect, a panel may be associated with an antenna group. For example, the panel 410 may be associated with the antenna group 430, the panel 412 may be associated with the antenna group 432, and the panel 414 may be associated with the antenna group 434.

In an aspect, a panel may be a unit of an antenna group to control beams independently. For example, within a panel, one beam can be selected and used for UL transmission. For example, one of the beams 440a, 440b may be selected for panel 410. In an aspect, a UE may be limited to a single panel for UL transmission. In another aspect, multiple panels may be used for UL transmission and across different panels, multiple beams (each selected per panel) may be used for UL transmission. For example, one of the beams 442a, 442b may be selected for panel 412, and one of the beams 444a, 444b may be selected for panel 414. In another aspect, multiple beams may be transmitted from the same panel. For example, the panel 410 may transmit both of the beam 440a and the beam 440b. A limited number of beams is illustrated for simplicity, but it should be understood that a panel may select from a larger number of beams, for example, depending on a frequency range of the transmission.

In an aspect, a panel may be a unit of an antenna group to control transmission power for the antenna group. For example, all antennas or antenna elements within the antenna group may use the same transmission power.

In an aspect, a panel may be a unit of an antenna group having a common UL timing. For example, all antennas or antenna elements within the antenna group may be configured with the same timing advance.

In an aspect, the panels of the MPUE 404 may be based on a hardware structure of the MPUE 404. For example, the MPUE 404 may include a hinge 420 between the panel 410 and the panel 412 such that the panel 410 and panel 412 may be oriented at an angle with respect to each other. Similarly, a hinge 422 may be located between the panel 412 and the panel 414. In an aspect, the panels 410, 412, 414 may be physically reconfigured (e.g., by folding the MPUE 404 at a hinge 420, 422, to change the orientation of the panels. The direction of the beams associated with each panel may also change when the panels 410, 412, 414 are physically reconfigured.

Figure 5:
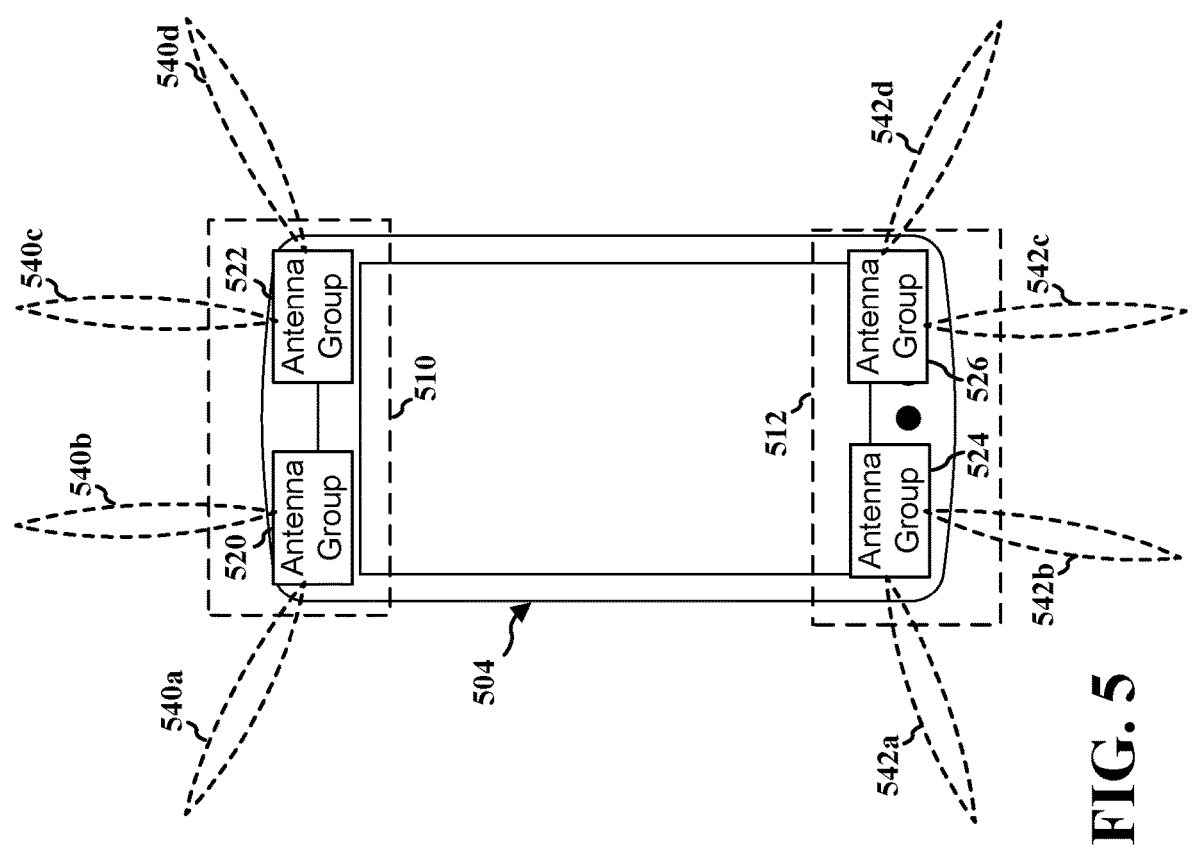
FIG. 5 is a conceptual diagram of a second example multi-panel UE.

In another aspect, the panels of the MPUE 404 may be dynamically defined, for example by selecting a subset of the total antennas or antenna elements as a panel. For example, FIG. 5 illustrates an example MPUE 504 that does not necessarily include hinges. The MPUE 504 may include multiple antenna groups 520, 522, 524, 526. The MPUE 504 may configure the antenna groups 520, 522, 524, 526 into multiple panels. For example, a first panel 510 may include antenna groups 520 and 522 and a second panel 512 may include antenna groups 524 and 526. When the first panel 510 is active, one of the beams 540a, 540b, 540c, 540d may be selected for uplink transmission. When the second panel 512 is active, one of the beams 542a, 542b, 542c, or 542d may be selected for uplink transmission. In an aspect, the MPUE 504 may dynamically configure panels including different combinations of the antenna groups 520, 522, 524, 526.

Figure 6:
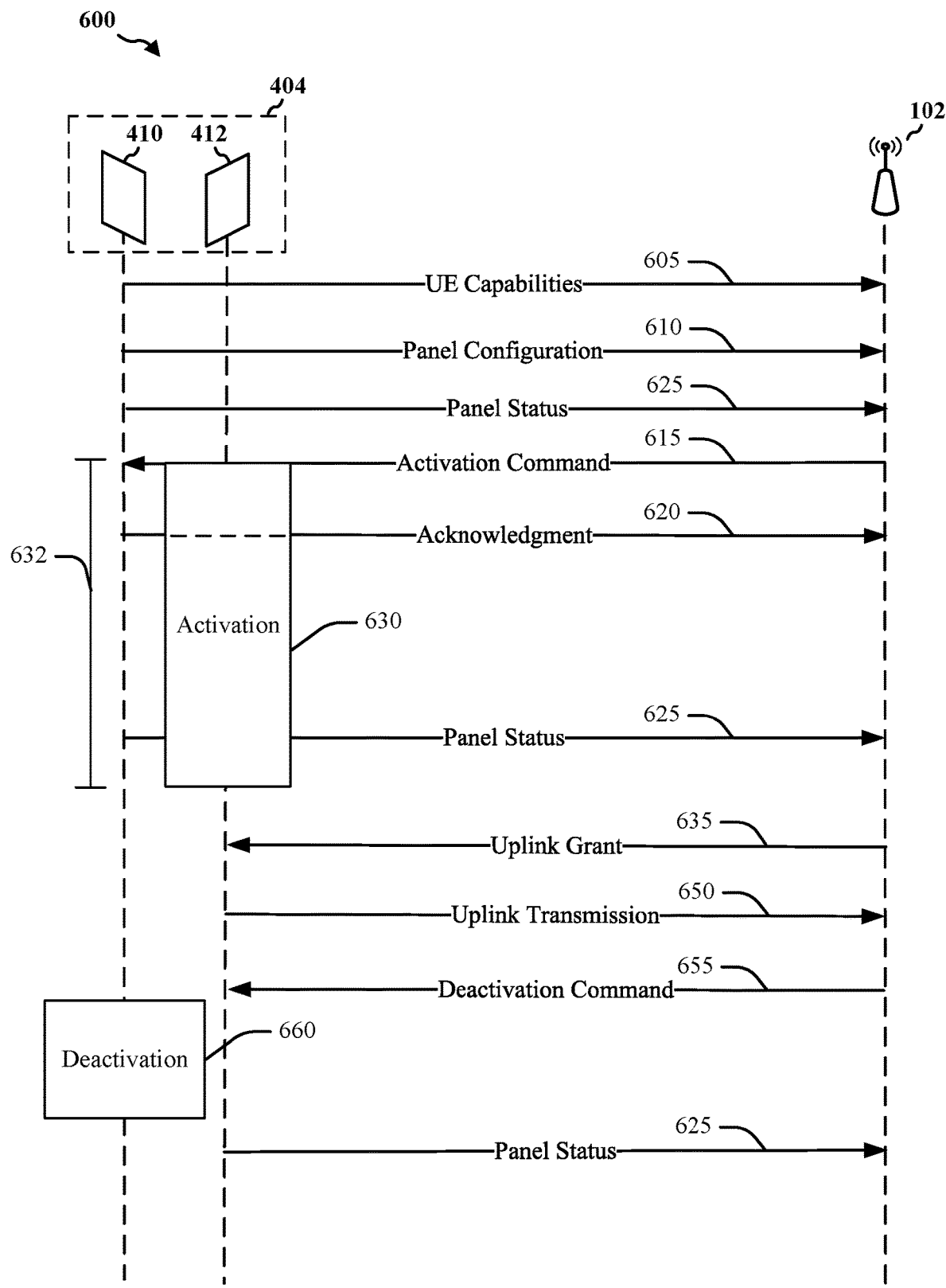
FIG. 6 is a message diagram showing example messages for activating and deactivating one or more panels of a multi-panel UE.

Turning to FIG. 6, an example message diagram 600 includes signaling messages that may be used to activate and/or deactivate one or more panels of an example MPUE 404.

The MPUE 404 may transmit UE capabilities 605, which may indicate that the MPUE 404 includes multiple panels. The UE capabilities 605 may be carried in an RRC configuration message.

The MPUE 404 may transmit a panel configuration 610. The panel configuration 610 may indicate sleep modes and corresponding activation times for each panel of the MPUE 404. The activation time may be a length of time for the MPUE 404 to transition the panel from the sleep mode to an active mode ready for transmission. For example, the activation time may be indicated as a number of milliseconds (ms) or as a number of slots for a given frame numerology. The activation time may be panel specific, that is, each panel 410, 412, 414 may have a different activation time. The activation time may also be mode specific. For example, the panel 410 may have an activation time from deep sleep mode, an activation time from light sleep mode, and an activation time for being selected as the transmitting panel. In an aspect, the panel configuration 610 may be carried on an RRC connection setup message. In another aspect, the panel configuration 610 may be transmitted on the uplink data channel. For example, in the case of dynamic panel configuration, the panel configuration 610 may be transmitted on the uplink data channel outside of an RRC message.

The base station 102 may transmit an activation command 615. The activation command 615 may indicate that the MPUE 404 should activate a specific panel according to an activation process 630. The activation process 630 may have an activation time 632, which may be panel-specific and/or status specific. In another aspect, the activation time 632 may be the same for all UEs and panels, for example, as defined in a standards document or regulation. As illustrated, for example, the activation command 615 may be received by an active first panel 410 and indicate activation of the second panel 412. The base station 102 may determine to transmit the activation command 615 to improve UL channel conditions for the MPUE 404. For example, the base station 102 may measure the channel quality and/or beam quality of UL transmissions from the MPUE 404. In particular, in the absence of beam correspondence between UL and DL, the MPUE 404 may be unable to determine the best beam or panel for UL transmission. Accordingly, the base station 102 may transmit the activation command 615 to activate the panel having the best beam based on measurements by the base station 102.

In an aspect, the activation command 615 may be transmitted within downlink control information (DCI). For example, a DCI format may include one or more bits that indicate a panel ID for an indicated panel. The MPUE 404 may activate or deactivate the indicated panel based on the current status of the panel. As a physical layer signal, a DCI may not receive an acknowledgment. The base station 102 and the MPUE 404 may measure the activation time 632 for activation process 630 of the panel from a time slot of the DCI. In another aspect, the activation command may be transmitted as a media access control (MAC) control element (CE) (MAC-CE). The MAC-CE may include one or more panel IDs and a new status for each panel ID. The MPUE 404 may acknowledge receipt of the MAC-CE by transmitting an acknowledgment 620 from a currently active panel (e.g., an active first panel 410). The base station 102 and the MPUE 404 may measure the activation time 632 of the activation process 630 for the panel from the time of the acknowledgment 620.

The MPUE 404 may transmit a panel status 625. The panel status 625 may indicate a current status of one or more of the panels 410, 412, 414. The panel status may change in response to an activation command 615 or a deactivation command 655. In an aspect, the panel status may change in response to a determination by the MPUE 404. For example, the MPUE 404 may determine to activate a new panel based on a maximum permissible exposure (MPE) limit affecting a currently active panel. For instance, if the current transmitting panel limits a transmission power due to an MPE limit, the MPUE 404 may activate another panel that may not be subject to the MPE limit, for example, because the other panel is not facing a user. As another example, the MPUE 404 may determine to deactivate a panel that is not being used. For example, if the base station 102 has scheduled the panel 410 for uplink transmissions, the MPUE 404 may determine to deactivate the panel 412 in order to save power. The panel status 625 may be transmitted after any change to the status of a panel.

The panel status 625 may be transmitted on the PUCCH. For example, the MPUE 404 may transmit one or more bits indicating the status of one or more panels. In an aspect, the PUCCH may include a panel ID and a panel status. In an aspect, a single bit could be transmitted to indicate whether the panel is active or inactive. In another aspect, the following table may indicate example panel status using two bits, for example.

TABLE 1

| Panel Status | PUCCH content |
|---|---|
| Inactive and deep-sleep | 00 |
| Inactive and light-sleep | 01 |
| Active but not transmitting | 10 |
| Active and selected for transmission | 11 |

The current panel status may affect the activation time 632 of a panel as indicated by the panel configuration 610. Accordingly, by transmitting a current panel status, both the MPUE 404 and the base station 102 may determine the correct activation time when a panel is activated.

An activation process 630 may be performed by the MPUE 404 to activate a panel from a sleep mode. As discussed above, in an aspect, a panel may be placed in a deep-sleep mode or a light-sleep mode. The deep-sleep mode may provide greater power savings, but may have a longer activation time 632 than the light-sleep mode. For example, the panel may be turned off. The light-sleep mode may have a shorter activation time 632, but may consume more power than the deep-sleep mode. For example, in the light-sleep mode, a panel may periodically perform channel estimates in order to select a beam. The activation process 630 may include one or more of: providing power to the panel, receiving reference signals, determining channel estimates, selecting beams, determining transmission power levels, and/or transmitting reference signals. The MPUE 404 may transmit a panel status 625 after activating a panel.

The base station 102 may transmit an uplink grant 635 for the MPUE 404 for a transmission time after the activation time 632 for the activation process 630. The uplink grant 635 may select the panel 412 (e.g., the second panel) for transmission.

The MPUE 404 may transmit an uplink transmission 650 from the second panel 412 after the activation time 632. The uplink transmission 650 may be based on the uplink grant 635. For example, both the first panel 410 and the second panel 412 may be active. The MPUE 404 may transmit the uplink transmission 650 from the second panel 412 as indicated by the uplink grant 635.

In an aspect, the base station 102 may transmit a deactivation command 655 indicating that the MPUE 404 should place a panel into a sleep mode. The base station 102 may have information that is useful for determining whether to place a panel in a sleep mode. For example, the base station 102 may measure uplink beam quality and may identify a panel that is experiencing adverse pathloss or a low-quality channel. Accordingly, the base station 102 may send the deactivation command 655 for a panel corresponding to an uplink beam. As another example, the base station 102 may be able to determine whether an uplink beam is causing interference to a transmission from another UE. Accordingly, the base station 102 may send the deactivation command 655 to mitigate interference.

The MPUE 404 may perform a deactivation process 660. The deactivation process 660 may be in response to the deactivation command 655, or may be based on a determination by the MPUE 404 to deactivate a panel. For example, as illustrated, the MPUE 404 may determine to deactivate the panel 410. Although the deactivation process 660 may occur over a period of time, the deactivation time may not necessarily be tracked or signaled because the deactivated panel may not be expected to do anything once deactivated. Accordingly, the base station 102 and/or the MPUE 404 may assume the panel is deactivated at the start of the deactivation process 660. The MPUE 404 may, however, transmit a panel status 625 to indicate that a panel is deactivated, for example, when the MPUE 404 determines to deactivate the panel.

Figure 7:
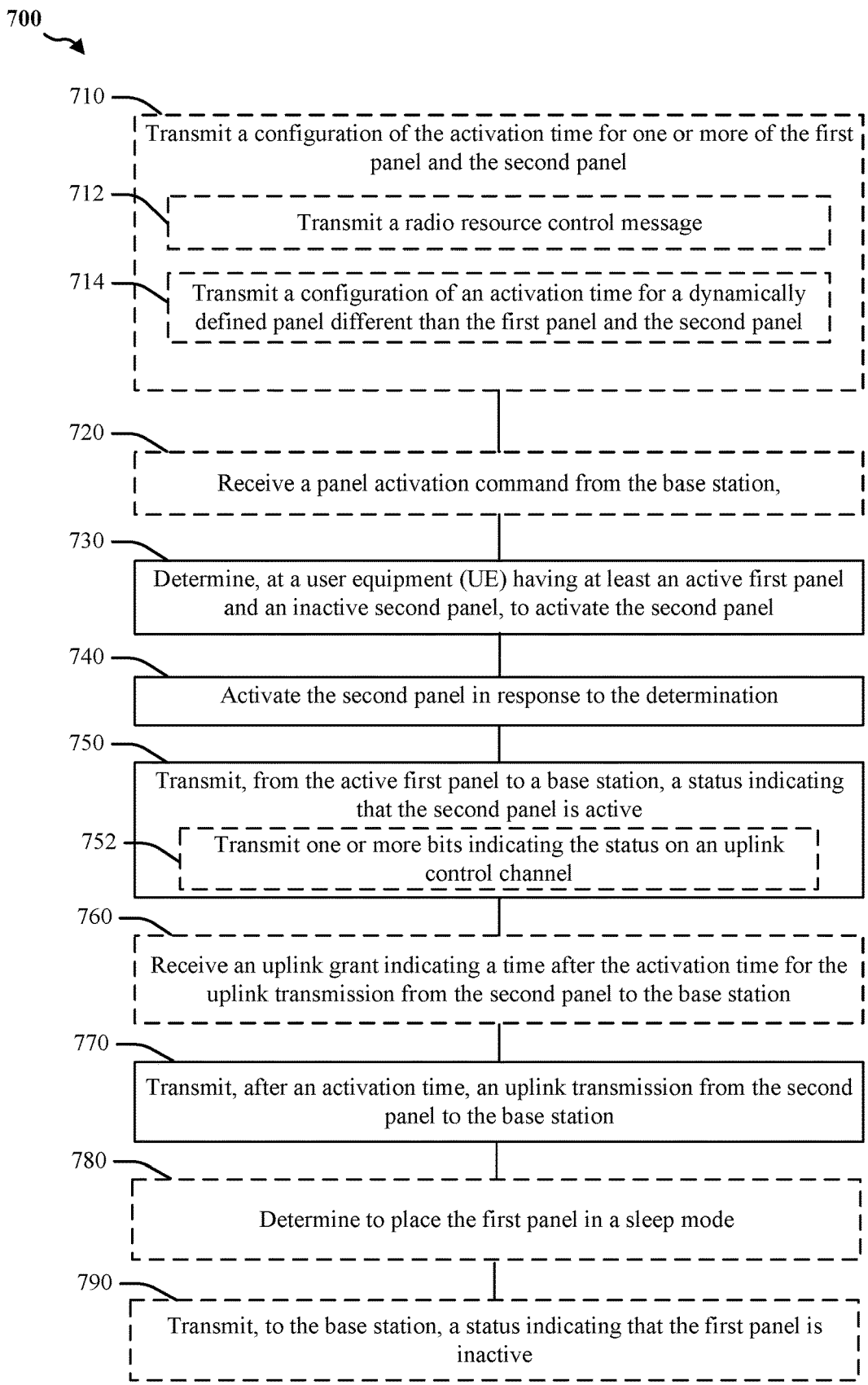
FIG. 7 is a flowchart of an example method of wireless communication for a UE.

FIG. 7 is a flowchart of an example method 700 of wireless communication. The method 700 may be performed by a UE (e.g., the UE 104, which may include the memory 360 and which may be the entire UE 104 or a component of the UE 104 such as the panel control component 140, the TX processor 368, the RX processor 356, and/or the controller/processor 359) or the MPUE 404, 504, which may also include a panel control component 140. The UE performing the method 700 may include at least a first panel (e.g., panel 410) and a second panel (e.g., panel 412).

At block 710, the method 700 may optionally include transmitting a configuration of the activation time for at least one of the first panel and the second panel. In an aspect, for example, the UE 104, the TX processor 368 and/or the controller/processor 359 may execute the panel control component 140 and/or the configuration component 142 to transmit the configuration (e.g., panel configuration 610) of the activation time 632 for at least one of the first panel 410 and the second panel 412. The configuration of the activation time 632 may indicate an activation time based on a status of the panel. For example, the configuration of the activation time may include an activation time for each potential status of the panel. The configuration of the activation time may be different for each panel. For example, the configuration of the activation time may indicate an activation time for the second panel and an activation time for the first panel.

In an aspect, at sub-block 712, the block 710 may include transmitting a RRC message. For example, the configuration component 142 may transmit the RRC message including the panel configuration 610. For instance, the panel configuration 610 may be an information element including the activation times.

In an aspect, at sub-block 714, the block 710 may include transmitting a configuration of an activation time for a dynamically defined panel different than the first panel and the second panel. For example, the configuration component 142 may transmit a panel configuration 610 of an activation time for a dynamically defined panel different than the first panel 410 and the second panel 412. For example, referring to FIG. 4, a dynamic panel may be defined to include the antenna group 432 and the antenna group 434, and the panel configuration 610 may include an activation time for such a dynamic panel. In view of the foregoing, the UE 104, the TX processor 368, and/or the controller/processor 359 executing the panel control component 140 and/or the configuration component 142 may provide means for transmitting a configuration of the activation time for at least one of the first panel and the second panel.

In an aspect, at block 720, the method 700 may optionally include receiving a panel activation command from the base station. In an aspect, for example, the UE 104, the RX processor 356, and/or the controller/processor 359 may execute the panel control component 140 and/or the activation-deactivation component 144 to receive the panel activation command 615 from the base station 102. In an aspect, the panel activation command may be received within a DCI. When the panel activation command is received within a DCI, the activation time 632 may be measured from receipt of the DCI. In another aspect, the panel activation command may be received as a MAC-CE. When the panel activation command is received as a MAC-CE, the activation time 632 may be measured from an acknowledgment of the MAC-CE. Accordingly, the UE 104, the RX processor 356, and/or the controller/processor 359 executing the panel control component 140 and/or the activation-deactivation component 144 may provide means for receiving a panel activation command from the base station.

In an aspect, at block 730, the method 700 may include determining, at the UE having at least an active first panel and an inactive second panel, to activate the second panel. In an aspect, for example, the UE 104, the TX processor 368 and/or the controller/processor 359 may execute the panel control component 140 and/or the activation-deactivation component 144, at a user (e.g., MPUE 404) having at least an active first panel 410 and an inactive second panel 412, to determine to activate the second panel 412. In an aspect, the activation-deactivation component 144 may determine to activate the second panel based on a signal quality or a maximum permissible exposure of the first panel 410 determined by the UE. In another aspect, the activation-deactivation component 144 may determine to activate the second panel 412 in response to the panel activation command (e.g., activation command 615 received in block 720. In view of the foregoing, the UE 104, the TX processor 368, the RX processor 356, and/or the controller/processor 359 executing the panel control component 140 and/or the activation-deactivation component 144 may provide means for determining to activate the second panel.

In an aspect, at block 740, the method 700 may include activating the second panel in response to the determination. In an aspect, for example, the UE 104, the TX processor 368 and/or the controller/processor 359 may execute the panel control component 140 and/or the activation-deactivation component 144 to activate the second panel 412 in response to the determination in block 730. For instance, the activation-deactivation component 144 may perform the activation process 630. Accordingly, the UE 104, the TX processor 368, the RX processor 356, and/or the controller/processor 359 executing the panel control component 140 and/or the activation-deactivation component 144 may provide means for activating the second panel in response to the determination.

In an aspect, at block 750, the method 700 may include transmitting, from the active first panel to a base station, a status indicating that the second panel is active. In an aspect, for example, the UE 104, the TX processor 368 and/or the controller/processor 359 may execute the panel control component 140 and/or the status component 146 to transmit, from the active first panel 410 to the base station 102, the status (e.g., panel status 625) indicating that the second panel 412 is active. For instance, the status may be selected from: an inactive and deep-sleep mode, an inactive and light-sleep mode, an active but not transmitting mode, and an active and transmitting mode. In an aspect, at sub-block 752, the block 750 may include transmitting one or more bits indicating the status on an uplink control channel. For instance, the status component 146 may transmit the one or more bits indicating the status on the PUCCH. In view of the foregoing, the UE 104, the TX processor 368, the RX processor 356, and/or the controller/processor 359 executing the panel control component 140 and/or the status component 146 may provide means for transmitting, from the active first panel to a base station, a status indicating that the second panel is active.

In an aspect, at block 760, the method 700 may optionally include receiving an uplink grant indicating a time after the activation time 632 for an uplink transmission from the second panel to the base station. In an aspect, for example, the UE 104, the RX processor 356, and/or the controller/processor 359 may execute the panel control component 140 to receive the uplink grant 635 indicating the time after the activation time 632 for the uplink transmission 650 from the second panel 412 to the base station 102. In view of the foregoing, the UE 104, the RX processor 356, and/or the controller/processor 359 executing the panel control component 140 may provide means for receiving an uplink grant indicating a time after the activation time 632 for an uplink transmission from the second panel to the base station.

In an aspect, at block 770, the method 700 may include transmitting, after an activation time, the uplink transmission from the second panel to the base station. In an aspect, for example, the UE 104, the TX processor 368, and/or the controller/processor 359 may execute the panel control component 140 and/or the transmission component 148 to transmit, after the activation time 632, the uplink transmission 650 from the second panel 412 to the base station 102. In view of the foregoing, the UE 104, the TX processor 368, the RX processor 356, and/or the controller/processor 359 executing the panel control component 140 and/or the transmission component 148 may provide means for transmitting, after an activation time, the uplink transmission from the second panel to the base station.

In an aspect, at block 780, the method 700 may optionally include determining to place the first panel in a sleep mode. In an aspect, for example, the UE 104, the TX processor 368, the RX processor 356, and/or the controller/processor 359 may execute the panel control component 140 and/or the activation-deactivation component 144 to determine to place the first panel 410 in a sleep mode. For example, the determination to place the first panel in a sleep mode may be in response to a deactivation command 655 from the base station 102. As another example, the activation-deactivation component 144 may determine to place the first panel in a sleep mode to save power or avoid an MPE limit. In view of the foregoing, the UE 104, the TX processor 368, the RX processor 356, and/or the controller/processor 359 executing the panel control component 140 and/or the activation-deactivation component 144 may provide means for determining to place the first panel in a sleep mode.

In an aspect, at block 790, the method 700 may optionally include transmitting, to the base station, a status indicating that the first panel is inactive. In an aspect, for example, the status component 146 may transmit, to the base station 102, a status indicating that the first panel 410 is inactive. For instance, the status component 146 may transmit the status in response to placing the first panel in the sleep mode. In view of the foregoing, the UE 104, the TX processor 368, and/or the controller/processor 359 executing the panel control component 140 and/or the status component 146 may provide means for transmitting, to the base station, a status indicating that the first panel is inactive.

Figure 8:
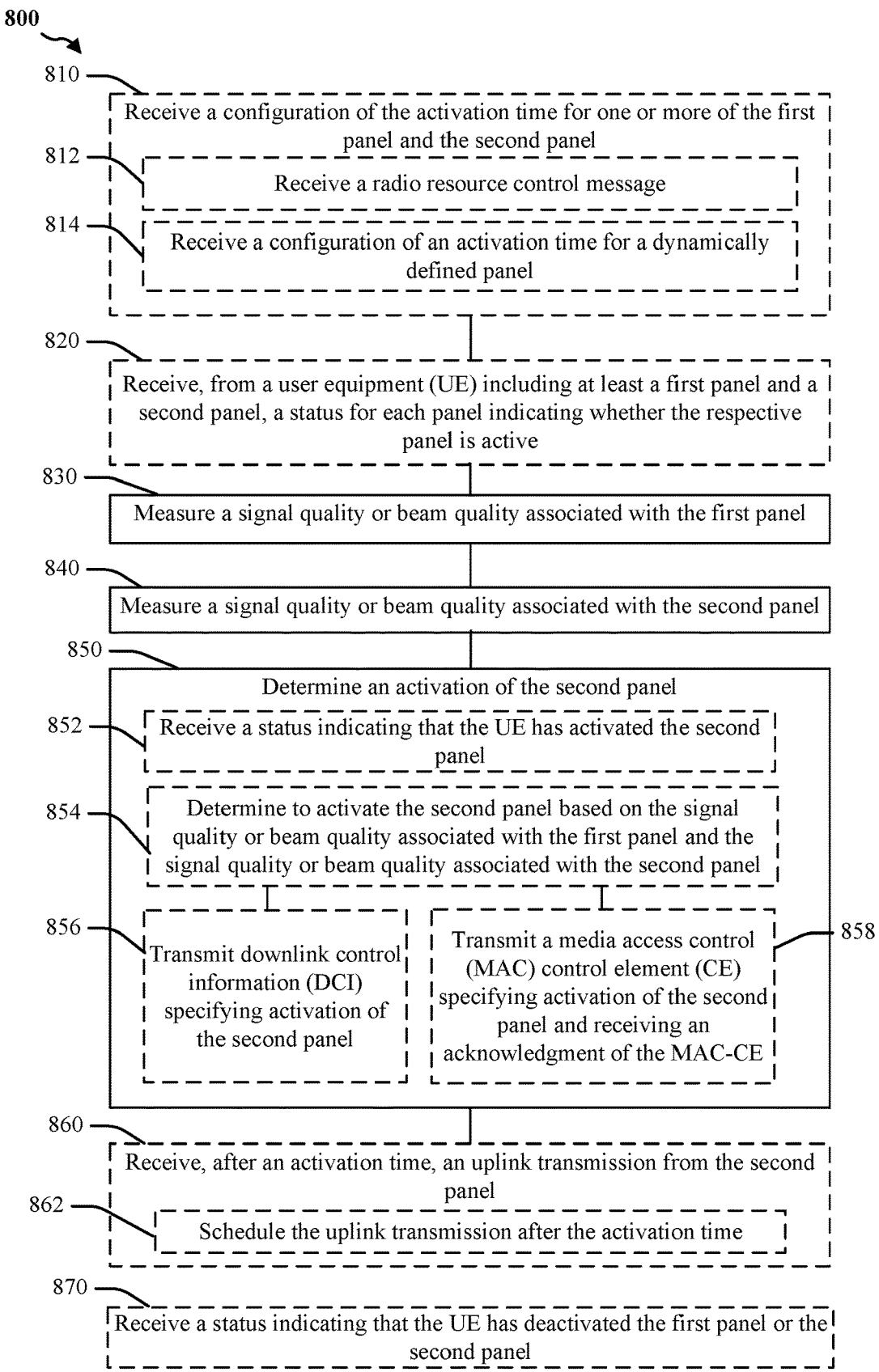
FIG. 8 is a flowchart of an example method of wireless communication for a base station.

FIG. 8 is a flowchart of an example method 800 of wireless communication. The method 800 may be performed by a base station (such as the base station 102, which may include the memory 376 and which may be the entire base station 102 or a component of the base station 102 such as the multi-panel component 198, TX processor 316, the RX processor 370, or the controller/processor 375). The method 800 may be performed in communication with an MPUE 404 including at least a first panel (e.g., panel 410) and a second panel (e.g., panel 412).

At block 810, the method 800 may optionally include receiving a configuration of the activation time for one or more of the first panel and the second panel. In an aspect, for example, the base station 102, the controller/processor 375, and/or the RX processor 370 may execute the multi-panel component 198 and/or the reception component 1048 to receive the configuration (e.g., panel configuration 610) of the activation time 632 for one or more of the first panel 410 and the second panel 412. The configuration of the activation time may indicate a length of the activation time 632 based on the status. The configuration of the activation time may indicate an activation time for the second panel 412 and an activation time for the first panel 410. In an aspect, at sub-block 812 the reception component 1048 may receive a radio resource control message including the panel configuration. In another aspect, at sub-block 814, the reception component 1048 may receive a configuration of an activation time for a dynamically defined panel. Accordingly, the base station 102, the controller/processor 375, and/or the RX processor 370 executing the multi-panel component 198 and/or the reception component 1048 may provide means for receiving a configuration of the activation time for one or more of the first panel and the second panel.

At block 820, the method 800 may include receiving, from a UE including at least a first panel and a second panel, a status for each panel indicating whether the respective panel is active. In an aspect, for example, the base station 102, the controller/processor 375, and/or the RX processor 370 may execute the multi-panel component 198 and/or the status component 1042 to receive, from the MPUE 404 including at least the first panel 410 and the second panel 412, a status (e.g., panel status 625) for each panel indicating whether the respective panel is active. For example, receiving the status may include receiving one or more bits indicating the status on an uplink control channel. The status may be selected from: an inactive and deep-sleep mode, an inactive and light-sleep mode, an active but not transmitting mode, and an active and transmitting mode. Accordingly, the base station 102, the controller/processor 375, and/or the RX processor 370 executing the multi-panel component 198 and/or the status component 1042 may provide means for receiving, from a UE including at least a first panel and a second panel, a status for each panel indicating whether the respective panel is active.

At block 830, the method 800 may include measuring a signal quality or beam quality associated with the first panel. In an aspect, for example, the base station 102, the controller/processor 375, and/or the RX processor 370 may execute the multi-panel component 198 and/or the measurement component 1044 to measure the signal quality or beam quality associated with the first panel 410.

At block 840, the method 800 may include measuring a signal quality or beam quality associated with the second panel. In an aspect, for example, the base station 102, the controller/processor 375, and/or the RX processor 370 may execute the multi-panel component 198 and/or the measurement component 1044 may measure the signal quality or beam quality associated with the second panel 412. In view of the foregoing, the base station 102, the controller/processor 375, and/or the RX processor 370 executing the multi-panel component 198 and/or the measurement component 1044 may provide means for measuring a signal quality or beam quality associated with the first panel and for measuring a signal quality or beam quality associated with the second panel.

At block 850, the method 800 may include determining an activation of the second panel. In an aspect, for example, the base station 102, the controller/processor 375, and/or the RX processor 370 may execute the multi-panel component 198 and/or the activation-deactivation component 1046 may determine an activation of the second panel 412. For example, at sub-block 852, the activation-deactivation component 1046 may receive a status indicating that the MPUE 404 has activated the second panel 412. That is, the base station 102 may be informed of a decision by the MPUE 404 to activate the second panel.

In another aspect, at sub-block 854, the activation-deactivation component 1046 may determine to activate the second panel 412 based on the signal quality or beam quality associated with the first panel 410 and the signal quality or beam quality associated with the second panel 412. In response to determining to activate the second panel, at sub-block 856, the activation-deactivation component 1046 may transmit a DCI specifying activation of the second panel 412. Alternatively, in response to determining to activate the second panel, at sub-block 858, the activation-deactivation component 1046 may transmit a MAC-CE specifying activation of the second panel and receive an acknowledgment of the MAC-CE. Accordingly, the base station 102, the controller/processor 375, and/or the RX processor 370 executing the multi-panel component 198 and/or the activation-deactivation component 1046 may provide means for determining an activation of the second panel.

At block 860, the method 800 may include receiving, after an activation time, an uplink transmission from the second panel. In an aspect, for example, the base station 102, the controller/processor 375, and/or the RX processor 370 may execute the multi-panel component 198 and/or the reception component 1048 to receive, after the activation time 632, an uplink transmission 650 from the second panel. In an aspect, at sub-block 862, the reception component 1048 may schedule the uplink transmission 650 after the activation time 632. Accordingly, the base station 102, the controller/processor 375, and/or the RX processor 370 executing the multi-panel component 198 and/or the reception component 1048 may provide means for receiving, after an activation time, an uplink transmission from the second panel.

At block 870, the method 800 may include receiving a status indicating that the UE has deactivated the first panel or the second panel. In an aspect, for example, the base station 102, the controller/processor 375, and/or the RX processor 370 may execute the multi-panel component 198 and/or the activation-deactivation component 1046 to receive a status indicating that the UE has deactivated the first panel or the second panel. Accordingly, the base station 102, the controller/processor 375, and/or the RX processor 370 executing the multi-panel component 198 and/or the reception component 1048 may provide means for receiving a status indicating that the UE has deactivated the first panel or the second panel.

Figure 9:
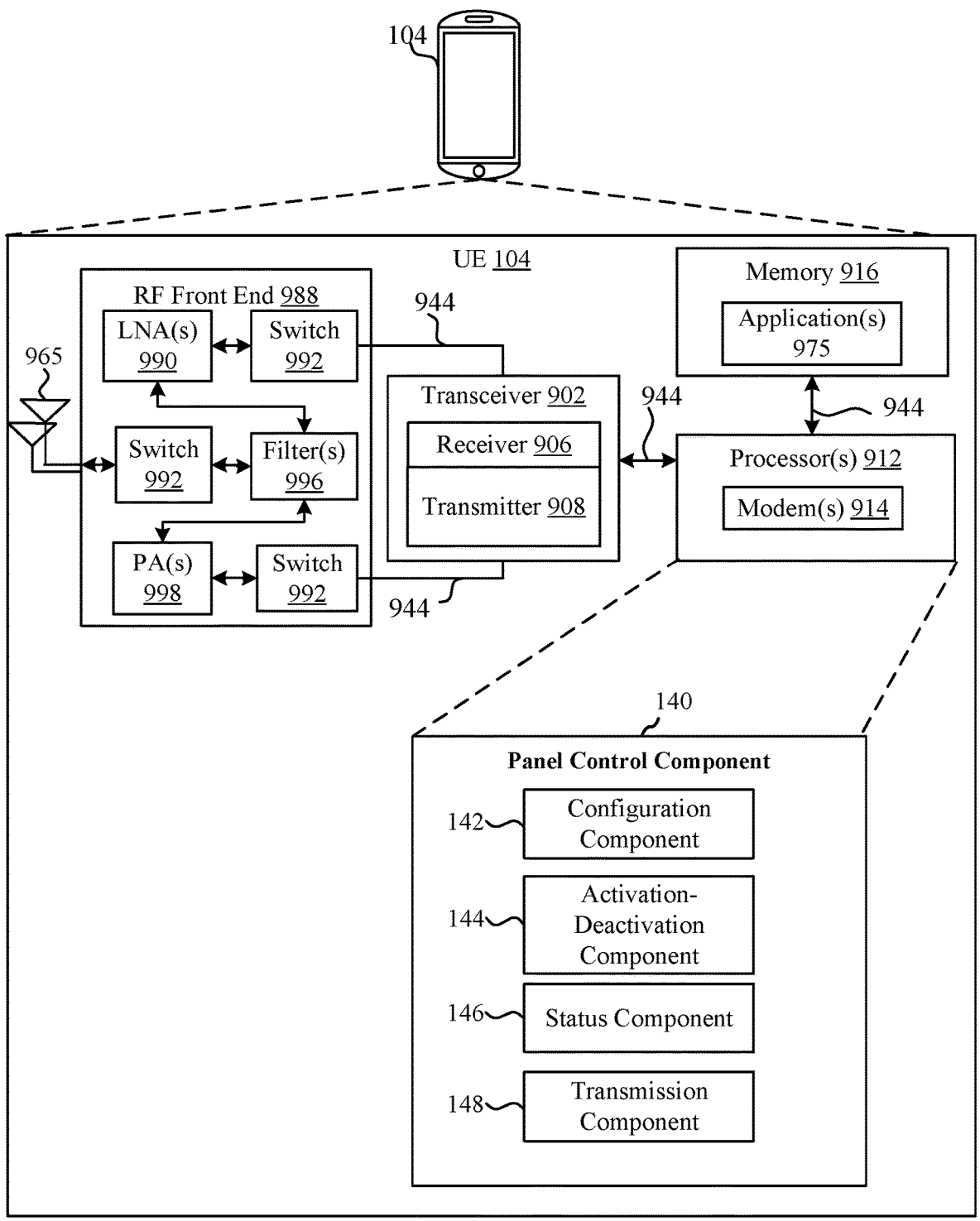
FIG. 9 is a schematic diagram of example components of the UE of FIG. 1.

Referring to FIG. 9, one example of an implementation of UE 104 may include a variety of components, some of which have already been described above, but including components such as one or more processors 912 and memory 916 and transceiver 902 in communication via one or more buses 944, which may operate in conjunction with modem 914 and panel control component 140 to enable one or more of the functions described herein related to signaling for panel activation. Further, the one or more processors 912, modem 914, memory 916, transceiver 902, RF front end 988 and one or more antennas 965, may be configured to support voice and/or data calls (simultaneously or non-simultaneously) in one or more radio access technologies. The antennas 965 may include one or more antennas, antenna elements, and/or antenna arrays.

In an aspect, the one or more processors 912 can include a modem 914 that uses one or more modem processors. The various functions related to panel control component 140 may be included in modem 914 and/or processors 912 and, in an aspect, can be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with transceiver 902. In other aspects, some of the features of the one or more processors 912 and/or modem 914 associated with panel control component 140 may be performed by transceiver 902.

Also, memory 916 may be configured to store data used herein and/or local versions of applications 975 or panel control component 140 and/or one or more of the subcomponents thereof being executed by at least one processor 912. Memory 916 can include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes defining panel control component 140 and/or one or more of the subcomponents thereof, and/or data associated therewith, when UE 104 is operating at least one processor 912 to execute panel control component 140 and/or one or more of the subcomponents thereof.

Transceiver 902 may include at least one receiver 906 and at least one transmitter 908. Receiver 906 may include hardware, firmware, and/or software code executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one base station 102. Additionally, receiver 906 may process such received signals, and also may obtain measurements of the signals, such as, but not limited to, Ec/Io, SNR, RSRP, RSSI, etc. Transmitter 908 may include hardware, firmware, and/or software code executable by a processor for transmitting data, the code comprising instructions and being stored in a memory (e.g., computer-readable medium). A suitable example of transmitter 908 may including, but is not limited to, an RF transmitter.

Moreover, in an aspect, UE 104 may include RF front end 988, which may operate in communication with one or more antennas 965 and transceiver 902 for receiving and transmitting radio transmissions, for example, wireless communications transmitted by at least one base station 102 or wireless transmissions transmitted by UE 104. RF front end 988 may be connected to one or more antennas 965 and can include one or more low-noise amplifiers (LNAs) 990, one or more switches 992, one or more power amplifiers (PAs) 998, and one or more filters 996 for transmitting and receiving RF signals.

In an aspect, LNA 990 can amplify a received signal at a desired output level. In an aspect, each LNA 990 may have a specified minimum and maximum gain values. In an aspect, RF front end 988 may use one or more switches 992 to select a particular LNA 990 and a corresponding specified gain value based on a desired gain value for a particular application.

Further, for example, one or more PA(s) 998 may be used by RF front end 988 to amplify a signal for an RF output at a desired output power level. In an aspect, each PA 998 may have specified minimum and maximum gain values. In an aspect, RF front end 988 may use one or more switches 992 to select a particular PA 998 and a corresponding specified gain value based on a desired gain value for a particular application.

Also, for example, one or more filters 996 can be used by RF front end 988 to filter a received signal to obtain an input RF signal. Similarly, in an aspect, for example, a respective filter 996 can be used to filter an output from a respective PA 998 to produce an output signal for transmission. In an aspect, each filter 996 can be connected to a specific LNA 990 and/or PA 998. In an aspect, RF front end 988 can use one or more switches 992 to select a transmit or receive path using a specified filter 996, LNA 990, and/or PA 998, based on a configuration as specified by transceiver 902 and/or processor 912.

As such, transceiver 902 may be configured to transmit and receive wireless signals through one or more antennas 965 via RF front end 988. In an aspect, transceiver may be tuned to operate at specified frequencies such that UE 104 can communicate with, for example, one or more base stations 102 or one or more cells associated with one or more base stations 102. In an aspect, for example, modem 914 can configure transceiver 902 to operate at a specified frequency and power level based on the UE configuration of the UE 104 and the communication protocol used by modem 914.

In an aspect, modem 914 can be a multiband-multimode modem, which can process digital data and communicate with transceiver 902 such that the digital data is sent and received using transceiver 902. In an aspect, modem 914 can be multiband and be configured to support multiple frequency bands for a specific communications protocol. In an aspect, modem 914 can be multimode and be configured to support multiple operating networks and communications protocols. In an aspect, modem 914 can control one or more components of UE 104 (e.g., RF front end 988, transceiver 902) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Referring to FIG. 10, one example of an implementation of base station 102 may include a variety of components, some of which have already been described above, but including components such as one or more processors 1012 and memory 1016 and transceiver 1002 in communication via one or more buses 1054, which may operate in conjunction with modem 1014 and multi-panel component 198 to enable one or more of the functions described herein related to signaling panel activation.

The transceiver 1002, receiver 1006, transmitter 1008, one or more processors 1012, memory 1016, applications 1075, buses 1054, RF front end 1088, LNAs 1090, switches 1092, filters 1096, PAs 1098, and one or more antennas 1065 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Some Further Example Embodiments

A first example method of wireless communication, comprising: determining, at a user equipment (UE) having at least an active first panel and an inactive second panel, to activate the second panel; activating the second panel in response to the determination; transmitting, from the active first panel to a base station, a status indicating that the second panel is active; and transmitting, after an activation time, an uplink transmission from the second panel to the base station.

The above first example method, further comprising transmitting a configuration of the activation time for at least one of the first panel and the second panel.

Any of the above first example methods, wherein the configuration of the activation time indicates a length of the activation time based on the status.

Any of the above first example methods, wherein the configuration of the activation time indicates an activation time for the second panel and an activation time for the first panel.

Any of the above first example methods, wherein transmitting the configuration comprises transmitting a radio resource control message.

Any of the above first example methods, wherein transmitting the configuration comprises transmitting a configuration of an activation time for a dynamically defined panel different than the first panel and the second panel.

Any of the above first example methods, wherein transmitting the configuration of the activation time for the dynamically defined panel comprises transmitting the configuration on an uplink data channel.

Any of the above first example methods, further comprising receiving a panel activation command from the base station, wherein the determination to activate the second panel is in response to the panel activation command.

Any of the above first example methods, wherein the panel activation command is received within a DCI.

Any of the above first example methods, wherein the activation time is measured from receipt of the DCI.

Any of the above first example methods, wherein the panel activation command is received as a MAC-CE.

Any of the above first example methods, wherein the activation time is measured from an acknowledgment of the MAC-CE.

Any of the above first example methods, wherein the activation time is a pre-defined length of time for any UE.

Any of the above first example methods, further comprising receiving an uplink grant indicating a time after the activation time for the uplink transmission from the second panel to the base station.

Any of the above first example methods, wherein transmitting the status comprises transmitting a one or more bits indicating the status on an uplink control channel.

Any of the above first example methods, wherein the status is selected from: an inactive and deep-sleep mode, an inactive and light-sleep mode, an active but not transmitting mode, and an active and transmitting mode.

Any of the above first example methods, wherein determining to activate the second panel is based on a signal quality or a maximum permissible exposure of the first panel determined by the UE.

Any of the above first example methods, further comprising determining to place the first panel in a sleep mode.

Any of the above first example methods, wherein the determination to place the first panel in a sleep mode is in response to a deactivation command from the base station.

An apparatus for wireless communication, comprising: a memory; and at least one processor coupled to the memory and configured to perform any of the above first example methods.

An apparatus for wireless communication, comprising means for performing any of the above first example methods.

A non-transitory computer-readable medium storing computer executable code, the code when executed by a processor causes the processor to perform any of the above first example methods.

A second example method of wireless communication, comprising: receiving, from a user equipment (UE) including at least a first panel and a second panel, a status for each panel indicating whether the respective panel is active; measuring a signal quality or beam quality associated with the first panel; measuring a signal quality or beam quality associated with the second panel; determining an activation of the second panel; and receiving, after an activation time, an uplink transmission from the second panel.

The above second example method, wherein receiving the uplink transmission from the second panel comprises scheduling the uplink transmission after the activation time.

Any of the above second example methods, wherein determining the activation of the second panel comprises receiving a status indicating that the UE has activated the second panel.

Any of the above second example methods, wherein determining the activation of the second panel comprises transmitting downlink control information (DCI) specifying activation of the second panel.

Any of the above second example methods, wherein determining the activation of the second panel comprises transmitting a media access control (MAC) control element (CE) specifying activation of the second panel and receiving an activation of the MAC-CE.

Any of the above second example methods, wherein determining the activation of the second panel comprises determining to activate the second panel based on the signal quality or beam quality associated with the first panel and the signal quality or beam quality associated with the second panel.

Any of the above second example methods, further comprising receiving a configuration of the activation time for one or more of the first panel and the second panel.

Any of the above second example methods, wherein the configuration of the activation time indicates a length of the activation time based on the status.

Any of the above second example methods, wherein the configuration of the activation time indicates an activation time for the second panel and an activation time for the first panel.

Any of the above second example methods, wherein receiving the configuration comprises receiving a radio resource control message.

Any of the above second example methods, wherein receiving the configuration comprises receiving a configuration of an activation time for a dynamically defined panel.

Any of the above second example methods, wherein receiving the configuration of the activation time for the dynamically defined panel comprises receiving the configuration on an uplink data channel.

Any of the above second example methods, wherein receiving the status comprises receiving one or more bits indicating the status on an uplink control channel.

Any of the above second example methods, wherein the status is selected from: an inactive and deep-sleep mode, an inactive and light-sleep mode, an active but not transmitting mode, and an active and transmitting mode.

An apparatus for wireless communication, comprising: a memory; and at least one processor coupled to the memory and configured to perform any of the above second example methods.

An apparatus for wireless communication, comprising: means for performing any of the above second example methods.

A non-transitory computer-readable medium storing computer executable code, the code when executed by a processor causes the processor to perform any of the above second example methods.

What is claimed is:

1. A method of wireless communication, comprising:
   determining, at a user equipment (UE) having at least an active first panel and an inactive second panel, to activate the second panel;
   activating the second panel in response to the determination;
   transmitting, from the active first panel to a base station, a status indicating that the second panel is active; and
   transmitting, after an activation time, an uplink transmission from the second panel to the base station.

2. The method of claim 1, further comprising transmitting a configuration of the activation time for at least one of the first panel and the second panel.

3. The method of claim 2, wherein the configuration of the activation time indicates a length of the activation time based on the status.

4. The method of claim 2, wherein the configuration of the activation time indicates an activation time for the second panel and an activation time for the first panel.

5. The method of claim 2, wherein transmitting the configuration comprises transmitting a radio resource control message.

6. The method of claim 2, wherein transmitting the configuration comprises transmitting a configuration of an activation time for a dynamically defined panel different than the first panel and the second panel.

7. The method of claim 6, wherein transmitting the configuration of the activation time for the dynamically defined panel comprises transmitting the configuration on an uplink data channel.

8. The method of claim 1, further comprising receiving a panel activation command from the base station, wherein the determination to activate the second panel is in response to the panel activation command.

9. The method of claim 8, wherein the panel activation command is received within downlink control information (DCI).

10. The method of claim 9, wherein the activation time is measured from receipt of the DCI.

11. The method of claim 8, wherein the panel activation command is received as a media access control (MAC) control element (CE).

12. The method of claim 11, wherein the activation time is measured from an acknowledgment of the MAC-CE.

13. The method of claim 1, wherein the activation time is a pre-defined length of time for any UE.

14. The method of claim 1, further comprising receiving an uplink grant indicating a time after the activation time for the uplink transmission from the second panel to the base station.

15. The method of claim 1, wherein transmitting the status comprises transmitting one or more bits indicating the status on an uplink control channel.

16. The method of claim 15, wherein the status is selected from: an inactive and deep-sleep mode, an inactive and light-sleep mode, an active but not transmitting mode, and an active and transmitting mode.

17. The method of claim 1, wherein determining to activate the second panel is based on a signal quality or a maximum permissible exposure of the first panel determined by the UE.

18. The method of claim 1, further comprising determining to place the first panel in a sleep mode.

19. The method of claim 18, wherein the determination to place the first panel in the sleep mode is in response to a deactivation command from the base station.

20. An apparatus for wireless communication, comprising:
a memory storing computer-executable instructions; and
at least one processor coupled to the memory and configured to execute the computer-executable instructions to:
determine, at a user equipment (UE) having at least an active first panel and an inactive second panel, to activate the second panel;
activate the second panel in response to the determination;
transmit, from the active first panel to a base station, a status indicating that the second panel is active; and
transmit, after an activation time, an uplink transmission from the second panel to the base station.

21. The apparatus of claim 20, wherein the at least one processor is configured to transmit a configuration of the activation time for at least one of the first panel and the second panel.

22. The apparatus of claim 21, wherein the at least one processor is configured to transmit a configuration of an activation time for a dynamically defined panel different than the first panel and the second panel on an uplink data channel.

23. The apparatus of claim 20, wherein the at least one processor is configured to receive a panel activation command from the base station, wherein the determination to activate the second panel is in response to the panel activation command.

24. The apparatus of claim 23, wherein the panel activation command is received within downlink control information (DCI), and wherein the activation time is measured from receipt of the DCI.

25. The apparatus of claim 23, wherein the panel activation command is received as a media access control (MAC) control element (CE), and wherein the activation time is measured from an acknowledgment of the MAC-CE.

26. The apparatus of claim 20, wherein the at least one processor is configured to receive an uplink grant indicating a time after the activation time for the uplink transmission from the second panel to the base station.

27. The apparatus of claim 20, wherein the at least one processor is configured to transmit one or more bits indicating the status on an uplink control channel, wherein the status is selected from: an inactive and deep-sleep mode, an inactive and light-sleep mode, an active but not transmitting mode, and an active and transmitting mode.

28. The apparatus of claim 20, wherein the at least one processor is configured to determine to activate the second panel based on a signal quality or a maximum permissible exposure of the first panel determined by the UE.

29. An apparatus for wireless communication, comprising:
means for determining, at a user equipment (UE) having at least an active first panel and an inactive second panel, to activate the second panel;
means for activating the second panel in response to the determination;
means for transmitting, from the active first panel to a base station, a status indicating that the second panel is active; and
means for transmitting, after an activation time, an uplink transmission from the second panel to the base station.

30. A non-transitory computer-readable medium storing computer executable code, the code when executed by a processor causes the processor to:
determine, at a user equipment (UE) having at least an active first panel and an inactive second panel, to activate the second panel;
activate the second panel in response to the determination;
transmit, from the active first panel to a base station, a status indicating that the second panel is active; and
transmit, after an activation time, an uplink transmission from the second panel to the base station.

* * * * *